United States Patent [19]

Morgan

[11] Patent Number: 5,438,864

[45] Date of Patent: Aug. 8, 1995

[54] METHOD FOR FLUORESCENT MEASURING THE VOLUMETRIC CAPACITY OF A CELL-ENGRAVED SURFACE

[75] Inventor: Russell M. Morgan, Indianapolis, Ind.

[73] Assignee: Praxair S.T. Technology, Inc., Danbury, Conn.

[21] Appl. No.: 111,767

[22] Filed: Aug. 25, 1993

[51] Int. Cl.⁶ .................................... G01F 17/00
[52] U.S. Cl. .................................... 73/149; 356/379
[58] Field of Search ................ 73/149, 104; 356/379

[56] References Cited

U.S. PATENT DOCUMENTS

| | | | |
|---|---|---|---|
| 4,628,728 | 12/1986 | Taylor et al. | 73/149 |
| 4,994,593 | 7/1990 | Kalstroem et al. | 356/379 |
| 5,235,851 | 8/1993 | Jones | 73/149 |

Primary Examiner—Hezron E. Williams
Assistant Examiner—Nashmiya Ashraf
Attorney, Agent, or Firm—Cornelius F. O'Brien

[57] ABSTRACT

A method of using a fluorescent fluid on a cell-engraved surface, such as an anilox roll, to determine the volumetric capacity of the cell-engraved surface by having the amount of electromagnetic radiation emitted by the exciting of the fluorescent fluid substantially proportional to the volume of the fluorescent fluid in the cells.

10 Claims, 4 Drawing Sheets

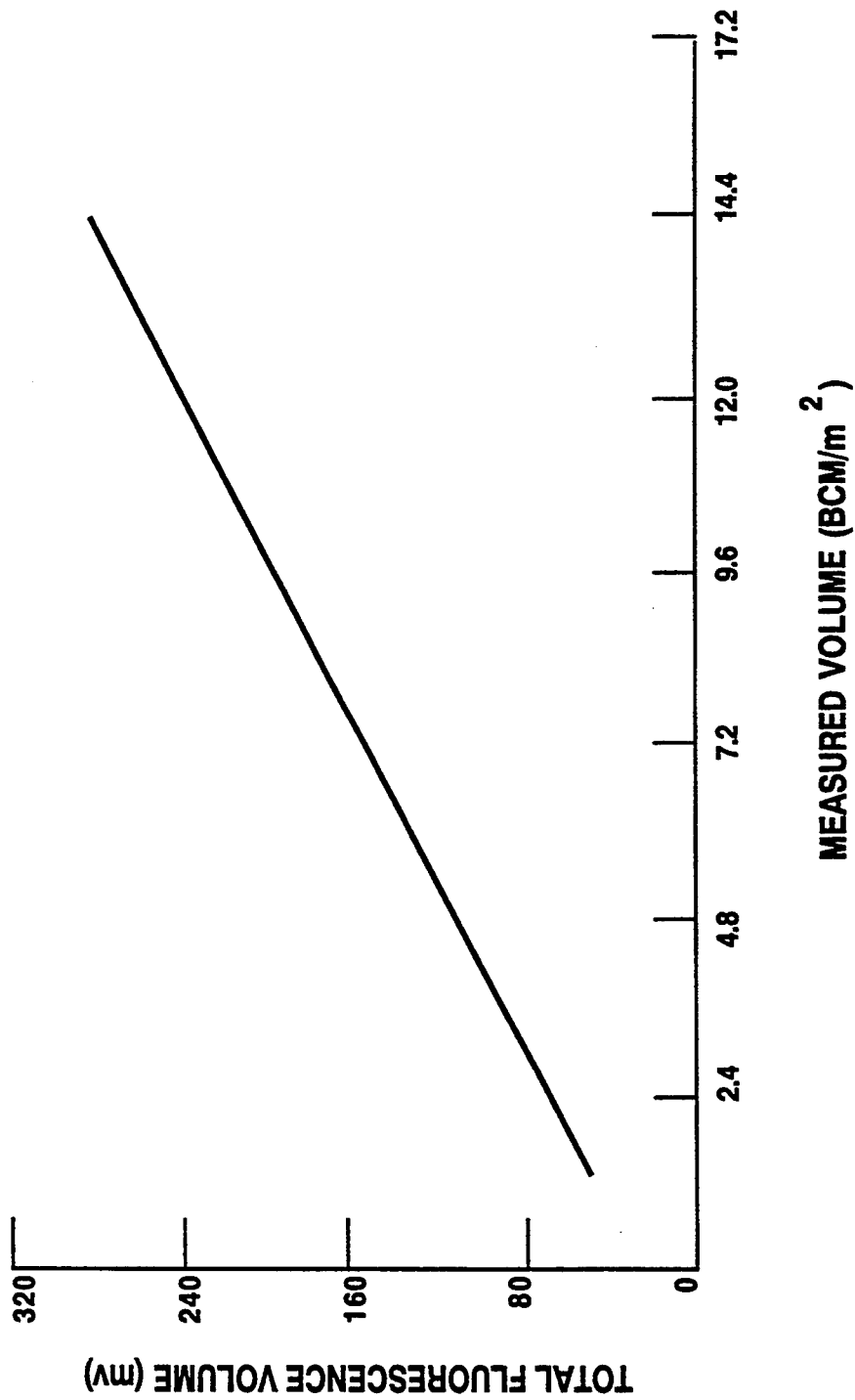

METHOD FOR FLUORESCENT MEASURING THE VOLUMETRIC CAPACITY OF A CELL-ENGRAVED SURFACE

FIELD OF THE INVENTION

The invention relates to a method of using fluorescent means to measure the volumetric capacity of a selected area, such as the volumetric capacity of a fluid metering roller.

BACKGROUND OF THE INVENTION

In the printing industry, fluid metering or transfer rolls are used to transfer measured amounts of ink onto printing plates. The rolls are generally referred to as anilox rolls. In other industries, liquid glue or other substances can be transferred onto surfaces of various substrates. The metering rolls are generally engraved with an array of closely spaced, shallow depressions referred to as cells. In the printing industry, ink is fed into the cells and onto the transfer surface of an anilox roll from an ink transfer roll turning within an ink bath. To remove the excess ink from the anilox roll surface, a doctor blade is scraped against the roll so that excess ink is removed and the remaining ink on the anilox roll is contained only in the cells. The ink in the cells is then transferred to a substrate, such as a polymer or paper material. The design or image formed by the ink cells is thus imprinted on the substrate.

The anilox roll is generally cylindrical and may be constructed in various diameters and lengths, containing cells of various sizes and shapes. The volumetric capacity of an anilox roll for a fluid such as ink is dependent upon the selection of cell size and shape, and number of cells per unit area. The cell pattern or design may be fine (many small cells per square inch) or coarse (fewer larger cells per square inch). Anilox rolls having high cell density are used for high-quality printing and rolls having the largest cells are used in non-printing applications such as the application of glue or paint.

Within the printing industry, the volumetric capacity of an anilox metering roll is specified as a combination of metric and English units (billions of cubic microns per square inch [BCM/inch$^2$]) and can vary from one billion cubic microns per square inch to possibly 500 billion cubic microns per square inch (one BCM=1 microliter). In a conventional printing operation, the anilox roll is forced against a printing plate and against a doctor blade during ink transfer with the result that surface friction wear occurs. This surface wear of the anilox roll can reduce the volume of the anilox roll. To maintain high quality printing applications or non-printing applications such as applications of glue or paint, it is necessary to accurately determine the volumetric capacity of the roll from time-to-time. Since the cell structure of most anilox rolls is too small to be observed by the naked eye, a metallurgical microscope is usually required for cell inspection and evaluation.

Previous attempts to determine the volumetric capacity of the anilox roll was to make measurements with a metallurgical microscope however, this procedure has not been satisfactory or accurate enough. The microscope may be used for direct examinations of the transfer cell structure, or indirectly by examinations of a molded replica of the cell structure. In either case, the determination of cell volume requires mathematical calculations which can often be inexact. The particular mathematical formula to be used will depend on the overall shape of the cells and the material used for the roll.

U.S. Pat. No. 4,628,728 discloses a method for measuring the volumetric capacity of an anilox roll by depositing a measured amount of ink onto the surface of an anilox roll and the area that the measured amount of ink will cover is determined. The ink is dispensed from a precision micro pipette directly onto the surface of the anilox roll. A sheet of transfer material having low absorbency is then spread over the roll and the ink deposit lying between the anilox roll and the transfer sheet is spread by the application of a scraper blade across the backside of the transfer paper. The engraved cells are filled by the excess ink as it is spread across the cell transfer surface. Upon completion of spreading of ink deposit, the transfer paper is carefully removed and allowed to dry. The area of the transfer paper impression is then measured by overlaying the impression area with a transparent sheet of graph paper having suitable grid lines. The known quantity of ink deposited upon the roll (in billions of cubic microns or microliter) is then divided by the measured area of the transfer impression (in square inches), with the quotient being the volumetric capacity of the roll in billions of cubic microns per square inch.

It is an object of the present invention to provide a method for measuring the volumetric capacity of a selected surface having engraved cell using fluorescent means.

It is another object of the present invention to provide a method for measuring the volumetric capacity of an anilox roll using fluorescent means.

It is another object of the present invention to provide a simple, direct and efficient method for measuring the volumetric capacity of a cell-engraved roll, such as an anilox roll.

SUMMARY OF THE INVENTION

The invention relates to a method for measuring the volumetric capacity of a surface containing a plurality of engraved cells comprising the steps;

(a) dispensing and spreading a fluorescent fluid onto a selected area of a surface defining a plurality of cells so as to fill said cells with the fluorescent fluid;

(b) exciting the fluorescent fluid with a radiation source to cause said fluorescent fluid to emit electromagnetic radiation and said emitted electromagnetic radiation being substantially proportional to the volume of the fluorescent fluid in the cells of the selected area; and (c) measuring the emitted electromagnetic radiation from the fluorescent fluid in the selected area and with the measured emitted electromagnetic radiation being proportioned to the volume of the fluorescent fluid in the cells, the volumetric capacity for the cell-engraved selected area can be obtained.

Fluorescence is the property of certain fluids which when illuminated by radiation (electromagnetic or particulate) will emit or radiate electromagnetic waves of a different wavelength only as long as the stimulus producing the emission is maintained. Fluorescent fluids for use in this invention can be any commercial oils or lubricants that contain fluorescence or any solvents such as oils or lubricants that have fluorescence added. The fluorescent property of certain fluids along with the characteristics of anilox rolls to carry or absorb a specific amount of fluid per unit surface area, are used to provide a means for measuring the volumetric capacity of anilox rolls according to this invention. In a primary embodiment, a small amount of a controlled pre-engineered concentration of a fluorescent liquid is deposited onto an anilox roll and a doctor blade system is then used to spread the excess fluid. The only requirement of the spread area is that it be equal to or exceed the fixed viewing window of the fluorescent measuring instrument (typically 10–60 mm$^2$). The spread fluorescent fluid is then measured for total fluorescence while still in the cells on the surface of the anilox roll. This fluorescent fluid is excited by a electromagnetic radiation source within a fluorescent measuring instrument. After transformation within the fluid, the emitted electromagnetic radiation from the fluid is collected and measured by the instrument. The output voltage value of the instrument is a measured value of the total fluorescence of the excited area and, because the concentration is controlled, it is directly proportional to the volume carrying capacity of the roll. As the area is fixed by the viewing window of the instrument, the measured signal is directly proportionate to the average depth of the cells. Thus with the signal from the fluorimeter being proportionate to the average depth of the cells and knowing the designed fixed selected area measured, the volumetric capacity of the anilox roll can easily be determined. This method provides an efficient and more accurate means for measuring the volumetric (area depth) capacity of anilox rolls without going through the process of producing a stain.

Preferable fluorescent indicator fluids for use in this invention are the rhodomine group of fluorophors such as blue excited, red emitting fluorphorus liquids mixed with a compatible oil. Suitable fluorophors are coumario, floural and violet 10. For most applications, the depth of the cells would be from 5 micron to 250 microns or more. The engraving of the cells can be done by any beam of energy such as by the laser means, or by mechanical or chemical means with laser means being the preferred. The diameter or contour of the cells can be controlled by the pattern and the number of laser-formed cells per lineal inch. With the selection of a specific fluorescent fluid in which the concentration of fluorescence material is known for a specific thickness when it is excited by a specific radiation source, then a fluorimeter can be used to measure the emitted electromagnetic radiation and the amount detected will be proportional to the volume of the cells for a specific area tested. Thus the amount of emitted electromagnetic radiation emitted from a specific area will be proportionate to the average thickness of the fluorescent liquid in the cells and knowing the size of the radiated area, the volumetric capacity of the engraved cells in the selected area can be directly measured. It is therefore preferred that the area to be evaluated be equal to or larger than the area that is observed by the fluorimeter. In most applications, the fluorescent fluid deposited in the laser-engraved cells will also be deposited on the surface area defining the cells. For accurate determination of the volumetric capacity of the laser-engraved roll, a doctor blade should be used to remove any excess fluorescent fluid from the surface of the roll so that the fluorescent fluid only remains in the cells. Preferably, the fluorescent fluid should have a low evaporation rate, be capable of wetting the roll and give a visible fluorescence signal in the area radiated by the fluorimeter. It is also preferable that the fluorescent fluid be excited by visible blue or short ultraviolet energy and give off a visible red spectrum. Many combinations of solvents and fluorescent materials are suitable for the practice of this invention.

The novel features which characterize the invention are defined by the appended claims. The foregoing advantages and features of the invention are for illustration purposes only and variation may be made by those skilled in the art within the principle and scope of the invention as expressed in the claims.

BRIEF DESCRIPTION OF THE DRAWINGS

FIG. 6 is a plot of total fluorescent signal in millivolts versus measured volume for several anilox rolls.

DETAILED DESCRIPTION OF THE INVENTION

Figure 1:
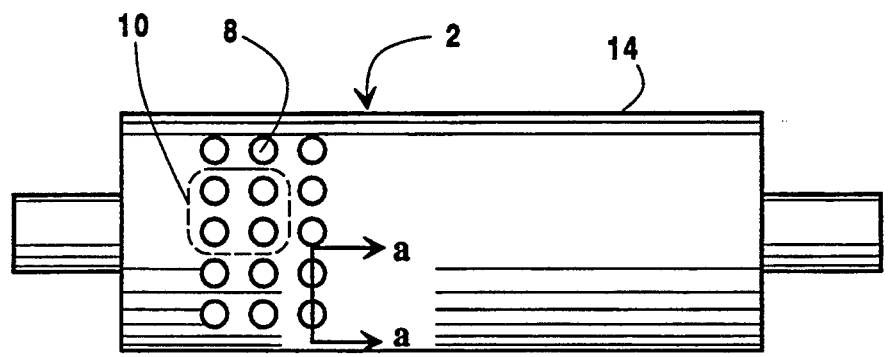
FIG. 1 is a side elevational view of an anilox roll showing a laser-engraved pattern on the surface of the roll comprised of cells shown greatly magnified.
Figure 2:
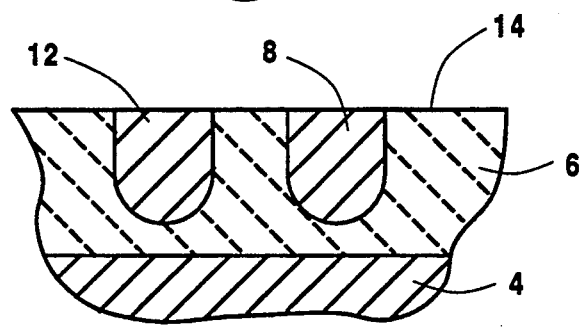
FIG. 2 is a cross-sectional view of the roll of FIG. 1 taken through line a—a.
Figure 3:
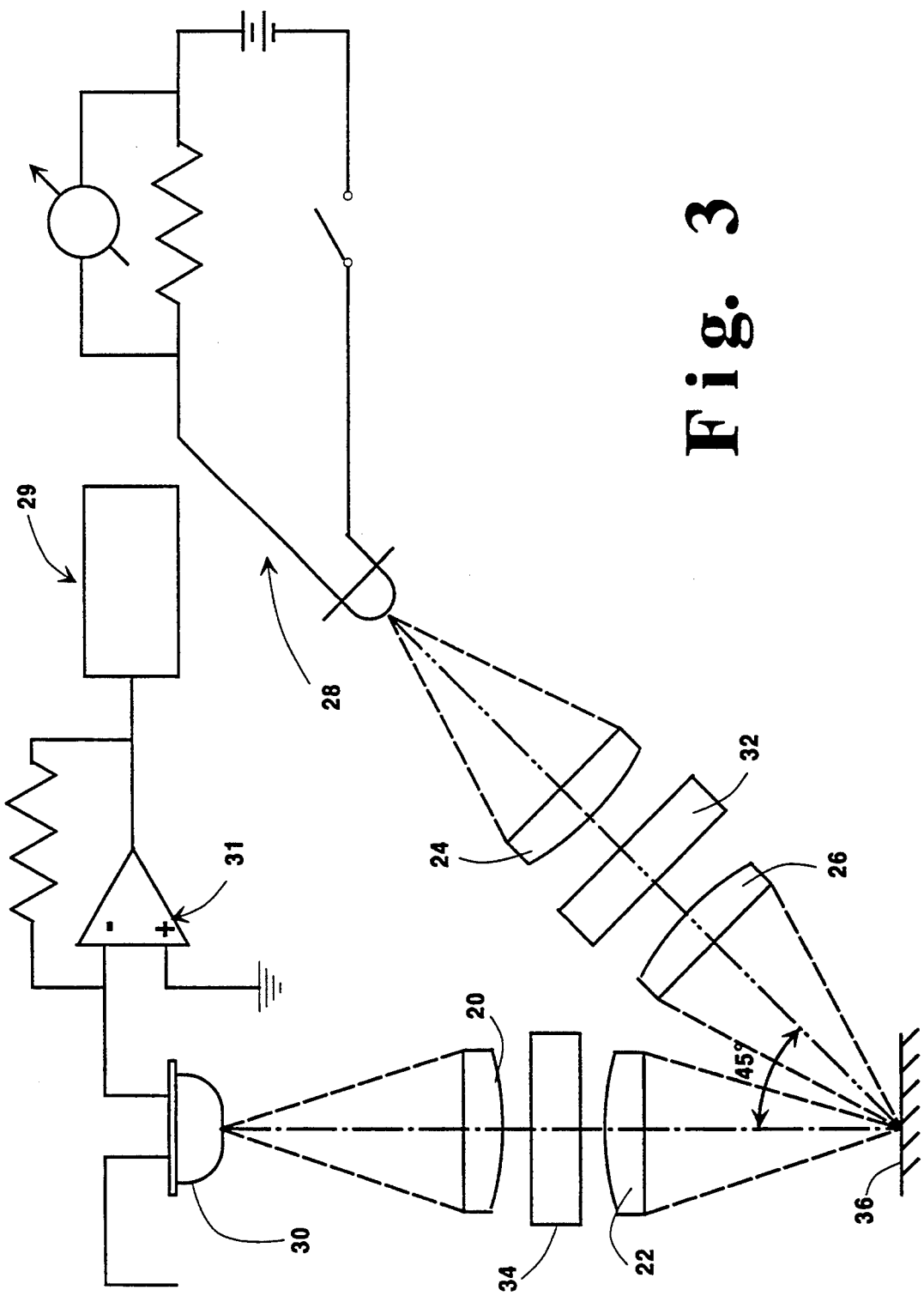
FIG. 3 is a schematic of a simple fluorescent measuring instrument.

FIGS. 1 and 2 show a conventional type cylindrical 2 having a substrate 4 made of steel and having a surface coating 6 of a ceramic. A portion of the coated surface is shown with a plurality of cells 8 formed by a conventional laser-engraved treatment. Specifically, the coated surface is engraved using a laser or other means to produce in the coated layer 6 a suitable pattern of cells 8 with each cell 8 having a preselected size so as to contain an amount of liquid to be transferred to a receiving surface. In practice, the number of cells would be significantly greater than that shown in the Figures and grouped together so that to the human eye they would not be identifiable. The depths of the laser-formed well 8 can vary from a few microns or less to as much as 200 microns or more. After the laser treatment of the coated surface 6 of the roll 2, the coated surface 14 is finished to remove any recast and finished to a desired roughness. Because these steps reduce the cell capacity, it is desirable to accurately measure the volumetric capacity of the roll transfer surface containing the cells. An area 10 of the surface is selected and then a volume of a selected fluorescent fluid 12 is deposited and spread onto the surface 14 and into the cells 8. The fluorescent fluid can be a mixture of a fluorescent fluid and a compatible solvent such as an oil based liquid. In the solution of the fluorescent fluid, a trade-off exists between the fluorophor concentration in the oil and the detector sensitivity for typical engraved surfaces. The concentration should be preferably low enough that the energy entering a liquid-filled hole from the instrument does not get significantly attenuated before it reaches the bottom of the hole, but high enough to be measured with simple detection systems. In the preferred embodiment, the fluorescent material should have a low evaporation rate, wets the roll, gives a reasonable visible fluorescence signal in the red operating region and can be excited by visible blue or short ultraviolet energy. As stated above, many combinations of solvents and fluorescent fluids would work with the preferred being a light oil with a basic rhodomine combination. Using the preferred fluorescent liquid, tests were conducted with the use of an apparatus, shown schematically in FIG. 3. Four lenses, 20, 22, 24 and 26 as shown in FIG. 3, are arranged to give 1:1 image magnification. Cree silicon carbide blue light emitting diode 28 (LED) (peak output at 470 mn, with a wide bandwidth stretching into the yellow) is aligned with lenses 24 and 26. Photocell 30 is a standard silicon detector and the DC transimpedance amplifier 31 is a standard design.

Figure 4:
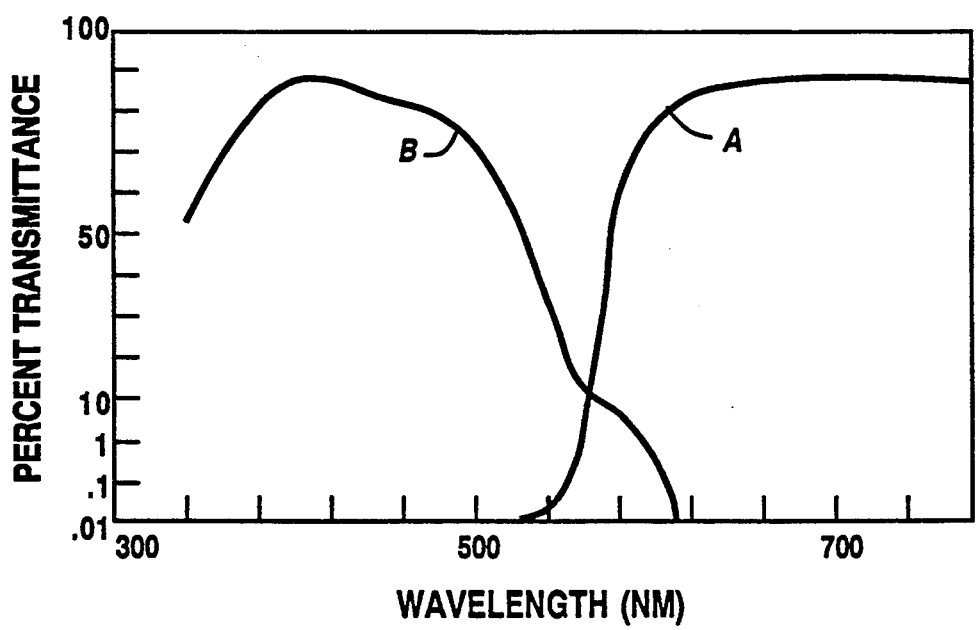
FIG. 4 is a plot of percent of transmittance versus wavelength for the filters used in FIG. 3.

Two sets of glass filters 32 and 34 are used to separate exciting from emitted light. The curve shown in FIG. 4 is from a filter book and, shows that one filter A favors seeing orange/red emission (34) and filter B favors seeing blue emission (32).

A quantitative check of the source-optics-detector train and filtering of blue and red signals of FIG. 3 was carried out as follows:

(a) The blue LED 28 is rated 8 microwatts output at 20 milliamps driving current. For this test, it is operated at a measured 34 milliamps, thereby assume 13.6 microwatts output (LED outputs are linear with current).

(b) Most of the blue emission is concentrated in the forward cone, all of which is collected by the first lens 24. The blue light in the wide-angle outer refraction cone was neglected.

(c) Color filters 32 and 34 are removed from the system. The target 36 is a very white matte cardboard diffuse reflector. The blue spot image on the flat target is an oval of about 40 $mm_2$ area.

(d) If Iin is the input watts from the LED 28, and if the target's 36 reflectance is considered to be 100%, then the steradiancy of the target in the vertically upward direction is Iin/$\pi$ watts/steridian.

(e) The first collecting lens 22 and 20 are D=25 mm, f=50 mm, and is part of a 1:1 pair. Hence, the solid angle it subtends at the target is $(\pi/4) \times (D/f)^2$ steradians, with D/f=$\frac{1}{2}$.

(f) Each glass/air surface of uncoated lenses 20, 22, 24 and 26 transmits 95% and since there are 8 such surfaces, then the net transmission of the optics is $(0.95)^8 = 0.66$.

(g) Silicon's energy conversion factor, for the photovoltaic detector 30 that was used is 0.25 amps/watt for blue light.

(h) Since the area of silicon photocell cell 30 is 4 $mm^2$, while the 1:1 image area of the original light source (with the 45° angle accounted for) is about 40 $mm^2$, the photocell 30 will collect only 10% of the reflected signal.

(i) The gain of the amplifier is $10^7$ volts/amp, or 10 volts/microamp and said amplifier is connected to a digital plot meter 29.

(j) Putting all the factors above together, we predict a voltage output for the white card target to be:

$(13.6/\pi) \times (\pi/4) \times (\frac{1}{2})^2 \times 0.66 \times 0.25 \times 0.1 \times 10 = 140$ millivolts.

The observed value was 156 millivolts and considering all the simplifying assumptions in the optical model, this value was in excellent agreement with the calculated value.

With the white card as target, here's what we see when the yellow pair of glass filters 34 is used;

| | |
|---|---|
| No filters | 155.8 mV |
| Orange filter only - we see only the long wavelength tail of the LED's emission | 5.3 mV |
| Blue filter 32 only - we see about half the blue peak emission, with the long tail cut off | 103.8 mV |
| With both filters in place - we see only the "overlap" light | 0.40 mV |

The signal shifts here, relative to the numbers above, are consistent with the spectral curves of the two sets of filters.

When the white card target is replaced by either a dry engraved cylinder surface, or such a surface coated with a non-fluorescent oil and "both filters in place", signals are below 0.01 mV, the limit of this simple apparatus' measurement capability.

The following are data taken using the apparatus shown in FIG. 3 and the preferred fluorescent fluid discussed above.

EXAMPLE 1

Figure 5:
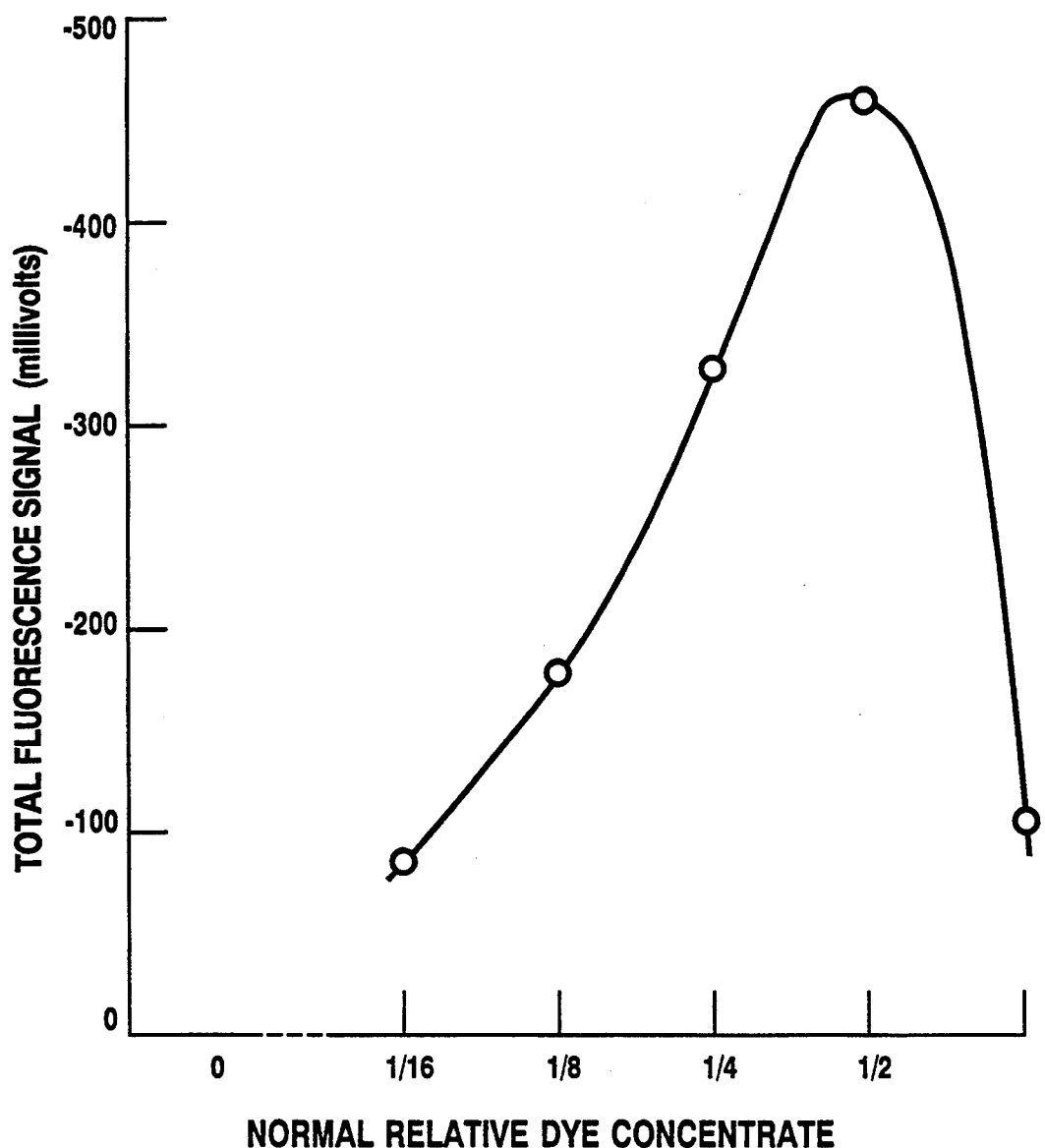
FIG. 5 is a plot of fluorescence signal versus fluorescent dye concentration 7 mils thick.

Glass test slides of internal thickness of 7.5 mils were constructed and a series of dilutions (in oil) of a saturated rhodomine dye solution was made up using dilutions of 1/16, $\frac{1}{8}$, $\frac{1}{4}$, $\frac{1}{2}$ and 1 with 1 being saturated and approximately 5000 ppm. These glass tests were located 6.6 mm from the front of the test instrument (target—FIG. 3). With the blue excitation source (FIG. 3) held at a digital meter 29 setting of −130 mV at the source, the fluorescent measurements gave the signal plotted in FIG. 5 for fluorescence signal versus dye concentration. The curve shows that the fluorescence signal output increases as the dye concentration increases. At high dye concentrations and 7.5 mil liquid thickness, the adsorption by the liquid is so great the curve goes extremely non-linear (dropping drastically instead of continuing to increase). With full concentration, the blue excited light is absorbed so strongly that the effective liquid sample thickness is no longer the full 7.5 mils (as is needed for full linear response), but is some much shorter thickness, getting worse as concentration rises. For deeply engraved cylinders, a diluted fluorescent dye should be used. For shallow engravings of 3 mils or less, a full-strength dye could be used; as the smaller the liquid thickness, the more linear will the fluorescent response be. The dye concentration can be tailored to any range of thickness to be used.

FIG. 6 is a signal plot of seven different engraved metering rolls, ranging from 2.7 BCM/$in_2$ to 14.5 BCM/$in_2$ using a $\frac{1}{2}$ concentrated saturated solution of the preferred dye discussed above. The maximum depth of the cells for these tests was 85 micron (3.3 mils). This $\frac{1}{2}$ concentration of the dye was used to optimize the signal for these shallow engravings. The data show that the relationship of measured total fluorescence on the meter 29 has a linear relationship with the volume of the fluorescent fluid in the engraved cells on the surface of the metering roll.

For metering rolls above 20 to 30 BCM/$in_2$, a $\frac{1}{8}$ or $\frac{1}{4}$ concentration fluid should be used to assume a linear relationship of measured fluorescence to the volume of the fluorescent fluid in the cells on the surface of the metering roll. It will be understood that various changes in the details, materials and arrangement of parts which have been described herein may be made by those skilled in the art within the principle and scope of the invention as expressed in the claims.

What is claimed:

1. A method for measuring the volumetric capacity of a surface containing a plurality of engraved cells comprising the steps;
   (a) providing a fluorescent fluid having a controlled pre-engineered concentration such that when said fluorescent fluid is excited by radiation, the fluid emits electromagnetic radiation in a linear relationship to volume of the fluid;
   (b) dispensing and spreading the fluorescent fluid onto a selected area of a surface defining a plurality of cells so as to fill said cells with a volume of fluorescent fluid;
   (c) exciting the fluorescent fluid in said cells with a radiation source to cause said fluorescent fluid in said cells to emit electromagnetic radiation in a linear relationship to the volume of the fluorescent fluid in the cells of the selected area; and
   (d) measuring the emitted electromagnetic radiation from the fluorescent fluid in the cells and with the measured emitted electromagnetic radiation being in a linear relationship to the volume of the fluorescent fluid in the cells, obtaining a volumetric capacity for the selected area.

2. The method of claim 1 wherein after step (a) the following step is added:
   (a') removing excess fluorescent fluid from the surface defining the plurality of cells so that only the cells contain fluorescent fluid.

3. The method of claim 2 wherein a doctor blade assembly is used to remove fluorescent fluid from said surface defining the plurality of cells.

4. The method of claim 1 wherein in step (a) the fluorescent fluid comprises a flurophor-solvent fluid.

5. The method of claim 1 wherein the fluorescent fluid in step (a) is selected from the rhodomine group of fluorophors.

6. The method of claim 1 wherein the surface defining the plurality of cells is a surface on an anilox roll.

7. The method of claim 1 wherein after step (a) the following step is added:
   (a') removing any excess fluorescent fluid from the surface defining the plurality of cells by wiping a doctor blade across said surface.

8. The method of claim 7 wherein the fluorescent fluid in step (a) is selected from the rhodomine group of fluorophors.

9. The method of claim 6 wherein the depth of the cells in the surface of the anilox roll is from 5 to 250 microns.

10. The method of claim 1 wherein the fluorescent fluid is a blue excited, red emitting fluorophorus mixed with a compatible oil based solvent.

* * * * *